(12) United States Patent
Lee (10) Patent No.: US 9,278,644 B2
(45) Date of Patent: Mar. 8, 2016

(54) ADB HEAD-LAMP SYSTEM AND BEAM CONTROL METHOD USING THE SAME

(71) Applicant: HYUNDAI MOBIS CO., LTD., Seoul (KR)

(72) Inventor: Hyun Soo Lee, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 5 days.

(21) Appl. No.: 14/335,819

(22) Filed: Jul. 18, 2014

(65) Prior Publication Data

US 2015/0124465 A1 May 7, 2015

(30) Foreign Application Priority Data

Nov. 6, 2013 (KR) .......................... 10-2013-0134321

(51) Int. Cl.
*B60Q 1/00* (2006.01)
*B60Q 1/08* (2006.01)
*B60Q 1/14* (2006.01)

(52) U.S. Cl.
CPC ................ *B60Q 1/085* (2013.01); *B60Q 1/143* (2013.01); *B60Q 2300/056* (2013.01); *B60Q 2300/33* (2013.01); *B60Q 2300/334* (2013.01)

(58) Field of Classification Search
CPC ............. B60Q 1/143; B60Q 2300/056; B60Q 2300/42; B60Q 2300/41; B60Q 2300/3321; B60Q 2300/333
USPC ................................................. 362/459–549
See application file for complete search history.

(56) References Cited

U.S. PATENT DOCUMENTS

2011/0280026 A1* 11/2011 Higgins-Luthman .. B60Q 1/143
362/466

FOREIGN PATENT DOCUMENTS

JP          2012197123       *  9/2012  ............... B60Q 1/08

* cited by examiner

*Primary Examiner* — William Carter (57) ABSTRACT

The present invention relates to an ADB head lamp system and a beam control method using the ADB head lamp system, the ADB head lamp system includes an ADB head lamp which is installed in a vehicle; a driving unit which drives the ADB head lamp; a road circumstance detecting unit; and a control unit which controls the driving unit to allow the ADB head lamp to radiate beam below a horizontal line in accordance with a signal which is generated by road circumstance information obtained by the road circumstance detecting unit, thereby implementing a beam which suppresses glare to the opposite vehicle, glare to a vehicle ahead, and minimize fatigue to a driver of the driving vehicle by recognizing a road circumstance.

6 Claims, 8 Drawing Sheets

UNDETECTED

DETECTED

DETECTED AS PLURAL VEHICLES

ADB HEAD-LAMP SYSTEM AND BEAM CONTROL METHOD USING THE SAME

CROSS-REFERENCE TO RELATED APPLICATIONS

This application claims priority to and the benefit of Korean Patent Application No. 10-2013-0134321 filed in the Korean Intellectual Property Office on Nov. 6, 2013, the entire contents of which are incorporated herein by reference.

TECHNICAL FIELD

The present invention relates to an ADB head lamp system and a beam control method using the ADB head lamp system, and more particularly, to an ADB head lamp system which evaluates circumstances on a road on which a vehicle drives and implements a beam to be emitted from an ADB head lamp in accordance with the road circumstances and a beam control method using the ADB head lamp system.

BACKGROUND ART

Generally, a vehicle includes a lighting system which has an illumination function so as to clearly view an object in a driving direction during nighttime driving and notifies a driving state of its own vehicle to the other vehicle or a pedestrian on the road. Here, a head lamp which is also called a head light is an illuminating lamp which lights the road ahead, on which a vehicle drives.

The head lamp is adjusted to emit a weaker beam onto a road which is adjacent to a center lane. It is regulated by the law so that a beam emission direction of the head lamp is adjusted to reduce an amount of beam which is shone onto a driver which is driving from an opposite direction, thereby preventing glare to the oncoming driver.

Therefore, an adaptive driving beam (ADB) head lamp was introduced in order to improve forward direction recognition of a driver and the oncoming driver which drives in an opposite lane. That is, the ADB head lamp is a light emitting device which radiates light while changing an illumination angle, a brightness, a width, and a length of the lamp.

The ADB head lamp may adjust the brightness of the head lamp so that a driver of a vehicle (hereinafter, referred to as an opposite vehicle) which approaches in an opposite lane does not receive glare.

Figure 1:
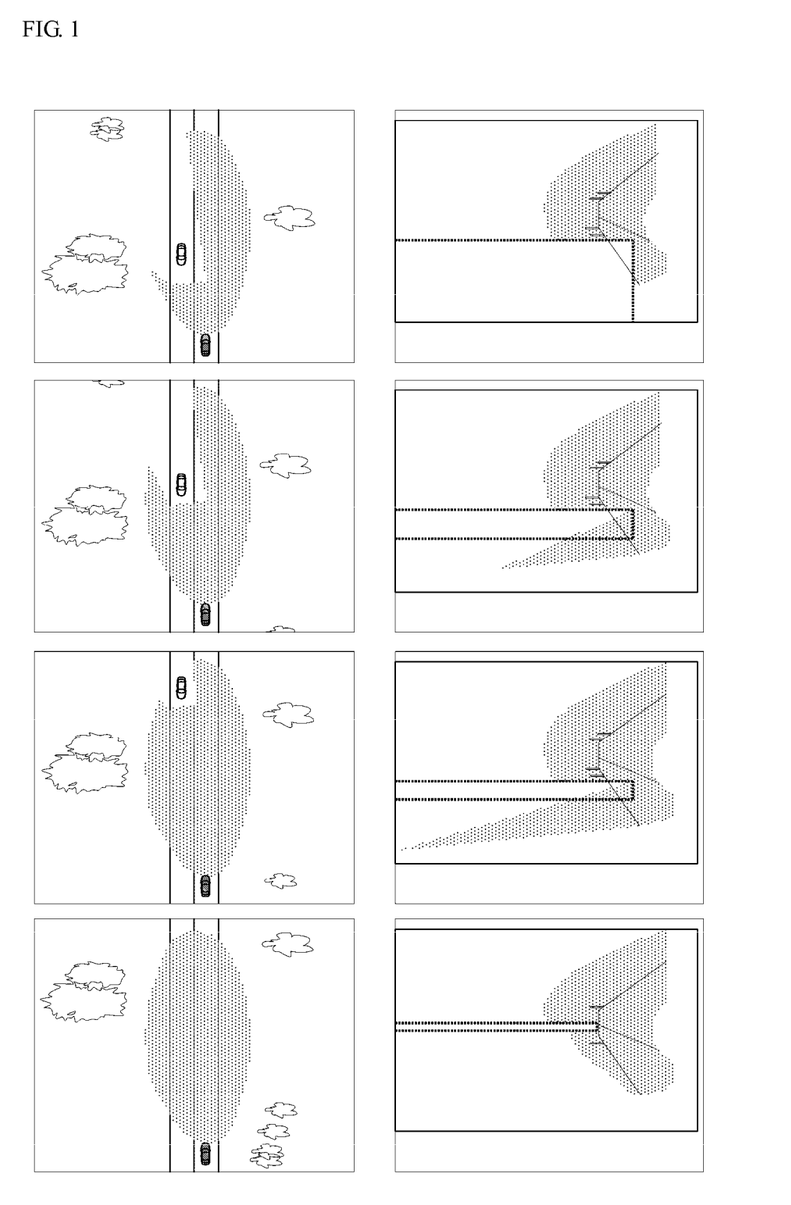
FIG. 1 is a view illustrating a beam pattern which is implemented by an ADB head lamp of the related art.

That is, as illustrated in FIG. 1, when there is no oncoming vehicle, the vehicle which includes the ADB head lamp drives with a high beam and when an oncoming vehicle appears, the vehicle changes a beam pattern into a beam pattern having an L shape. Further, the vehicle uses a swivel actuator to form a dark zone in which no glare will form to affect the oncoming vehicle. Thereafter, the beam status of the ADB head lamp returns to the high beam after the oncoming vehicle passes by.

However, an ADB head lamp of the related art operates only depending on whether there is an oncoming vehicle or a vehicle ahead, regardless of a road condition. In this case, the ADB head lamp operates only depending on whether a camera installed in a vehicle detects a vehicle, so that when a median strip is provided as on a highway, erroneous operations may be caused due to various road obstacles.

Figure 2:
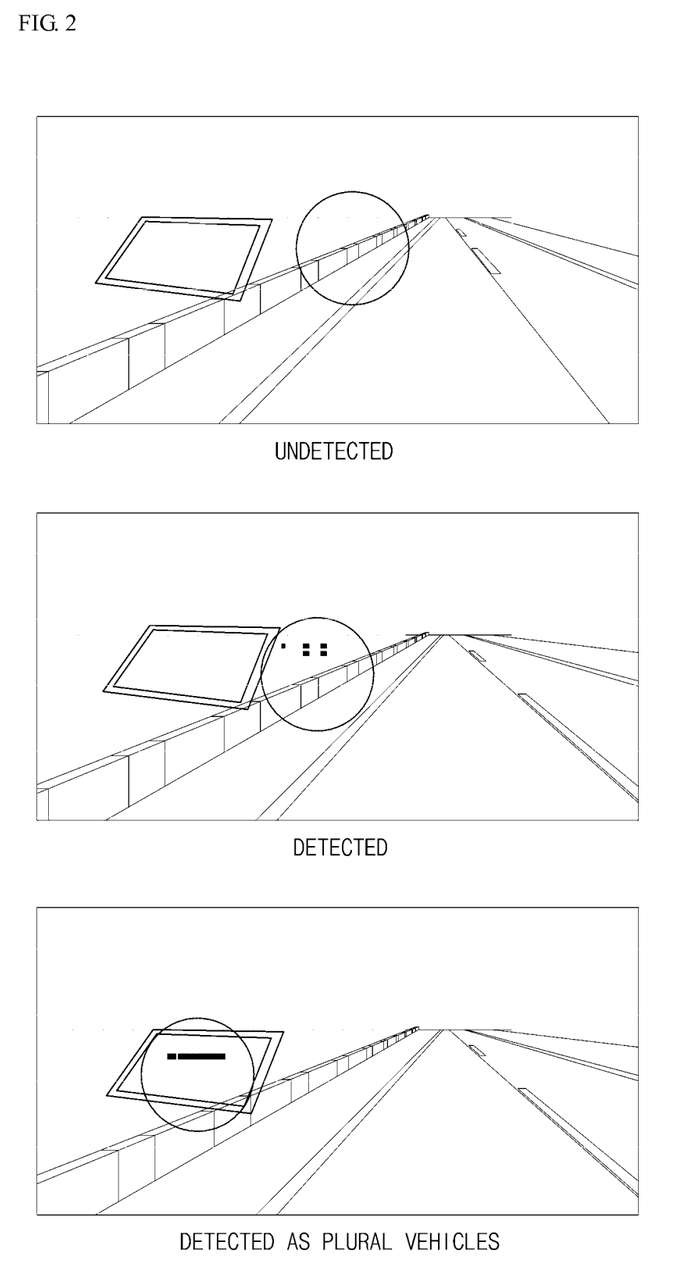
FIG. 2 is a view illustrating an erroneous operation by the ADB head lamp of the related art.

That is, as illustrated in FIG. 2, the camera repeatedly detects the median stripe during driving. Therefore, the erroneous operation causes fatigue to the drive and causes glare to a driver who drives ahead and acts as a dangerous factor of nighttime driving.

Figure 3:
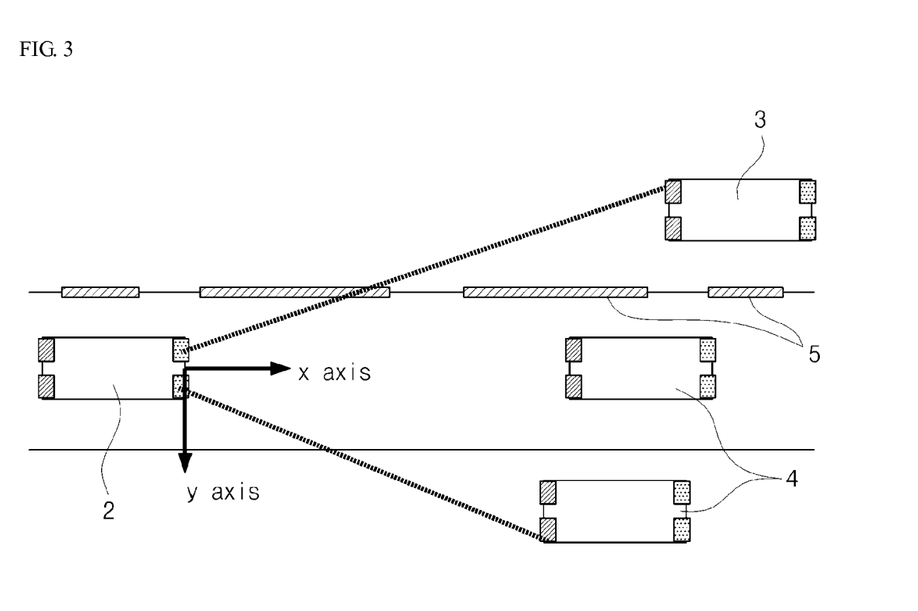
FIG. 3 is a view illustrating a vehicle which drives on a road in which a median strip is installed.

As illustrated in FIG. 3, an ADB head lamp which implements a beam to suppress glare to the opposite vehicle 3, glare to the vehicle ahead, and minimize fatigue to the driver of the driving vehicle 2 by recognizing a driving circumstance is required. In FIG. 3, reference numeral 5 denotes a median strip.

SUMMARY OF THE INVENTION

The present invention has been made in effort to provide an ADB head lamp system which evaluates circumstances of a road on which a vehicle drives and implements a beam to be emitted from an ADB head lamp in accordance with the road circumstances to implement a beam which suppresses glare to the oncoming vehicle, glare to the vehicle ahead, and minimize fatigue to the driver of the driving vehicle and a beam control method using the ADB head lamp system.

The present invention provides an ADB head lamp including: an ADB head lamp which is installed in a vehicle; a driving unit which drives the ADB head lamp; a road circumstance detecting unit; and a control unit which controls the driving unit to allow the ADB head lamp to emit a beam below a horizontal line in accordance with a signal which is generated by road circumstance information obtained by the road circumstance detecting unit.

Here, the road circumstance detecting unit may be a camera and/or a GPS navigation device which are provided in the vehicle and will obtain road circumstance information of the vehicle which is driving, through the camera and/or the GPS navigation device.

The road circumstance information may be positional information of a median strip or additional median obstacles (hereinafter, referred to as a street tree on the median") such as trees or concrete barriers.

When the road circumstance information is determined as a median strip or a street tree on the median, the control unit may only control a ADB head lamp toward the median strip or the street tree on the median among the ADB head lamps of the vehicle to irradiate beam below a horizontal line.

A beam irradiating range of a beam which is emitted below the horizontal line may be adjusted in accordance with a distance from a vehicle which drives ahead The present invention further provides: a beam control method using an ADB head lamp system, including: obtaining information on a median strip or a street tree on the median by a road circumstance detecting unit which is installed in a vehicle; transmitting a signal regarding information on the median strip or the street tree on the median; and controlling, by a controller which receives the signal, a driving unit which drives the ADB head lamp to allow only the ADB head ramp toward the median strip or the trees serving as a median strip street tree on the median among the ADB head lamps of the vehicle to emit a beam below a horizontal line.

The range of a beam which is emitted below the horizontal line may be adjusted in accordance with a distance from a vehicle which drives ahead.

Here, the road circumstance detecting unit may be a camera and/or a GPS Navigation device.

Furthermore, the camera may use a traffic sign recognition (TSR) function.

The ADB head lamp system with the above-described configuration according to an exemplary embodiment of the present invention may implement a beam which suppresses glare to the oncoming vehicle, glare to a vehicle ahead, and minimize fatigue to a driver of the driving vehicle by recognizing a road circumstance.

Specifically, in the case of a road on which obstacles such as a median strip or a street tree on the median are provided, occurrence of erroneous operation is minimized to minimize the glare.

Accordingly, the ADB head ramp system prevents a beam pattern from being frequently changed so that fatigue to a drive may be reduced.

A control method of the ADB head lamp system with the above-described configuration according to an exemplary embodiment of the present invention uses the ADB head ramp system to implement a beam which suppresses glare to the opposite vehicle, glare to a vehicle ahead, and minimize fatigue for a driver of the driving vehicle by recognizing a road circumstance.

DETAILED DESCRIPTION OF THE INVENTION

Hereinafter, exemplary embodiments of the present invention will be described in detail with reference to the accompanying drawings in order to clarify means for solving the technical problems of the present invention. However, when the description on a related technology obscures the gist of the present invention, the description thereof will be omitted. Furthermore, terminologies described below are defined in consideration of the function in the present invention and may vary depending on an intension of a designer or a manufacturer or a custom. Accordingly, the terminology needs to be defined base on details throughout this specification. Further, throughout the specification, like reference numerals denotes like component.

Hereinafter, an ADB head lamp system according to an exemplary embodiment of the present invention will be described.

Figure 4:
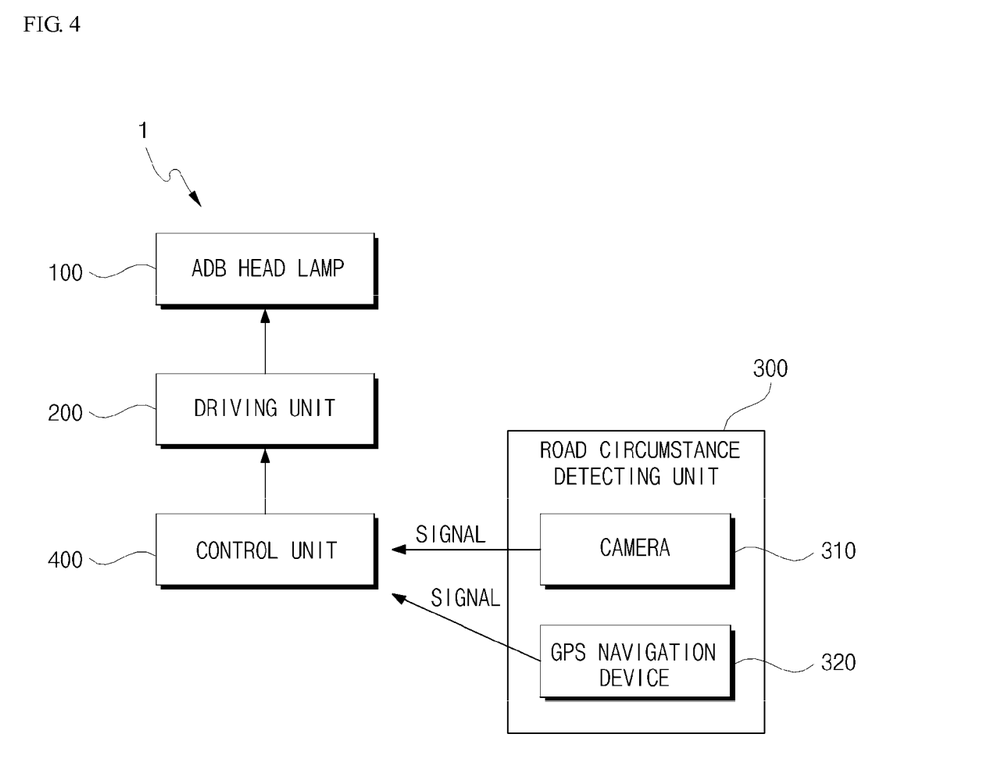
FIG. 4 is a view illustrating an ADB head lamp system according to an exemplary embodiment of the present invention.

As illustrated in FIG. 4, an ADB head lamp system 1 according to an exemplary embodiment of the present invention may include an ADB head lamp 100, a driving unit 200, a road circumstance detecting unit 200, and a control unit 400.

The ADB head lamp 100 is driven by the driving unit 200 to perform a function (motorway) for securing long-distance visibility during high speed driving, a function (sequential or static bending) for securing a front and side visibility at a cross-road or curved road, a function as a turn signal, and a function (daytime running light (DRL) & position) for ascertaining presence of a vehicle during daytime driving in addition to a function as a low beam or a high beam.

Here, a smart shield actuator (SSA), a swivel intelligent step motor (ISM), a leveling ISM, and an LED driving module (LDM) may be used as the driving unit 200. Here, the SSA is an actuator which drives a rotary shield (not illustrated) which is provided in the ADB head lamp in order to change a beam pattern in accordance with the type of roads. The LDM refers to a driving module which drives an LED having various functions in the case of an ADB head lamp which uses an LED as a light source.

Therefore, the driving unit 200 operates individual components of the ADB head lamp 100 to implement beam patterns (a class C, a class V, a class E, and a class W).

The road circumstance detecting unit 300 uses a sensor to determine a type of a road on which the vehicle 2 currently runs.

A camera 310 or a GPS navigation device 320 may be used as the road circumstance detecting unit 300. Specifically, a traffic signal recognition function may be used for the camera 310.

The control unit 400 receives a signal based on information on a road circumstance which is recognized by the road circumstance detecting unit 300. For example, the control unit 400 may receive a signal based on information on a road on which median strips or street trees on the median are provided.

Figure 5:
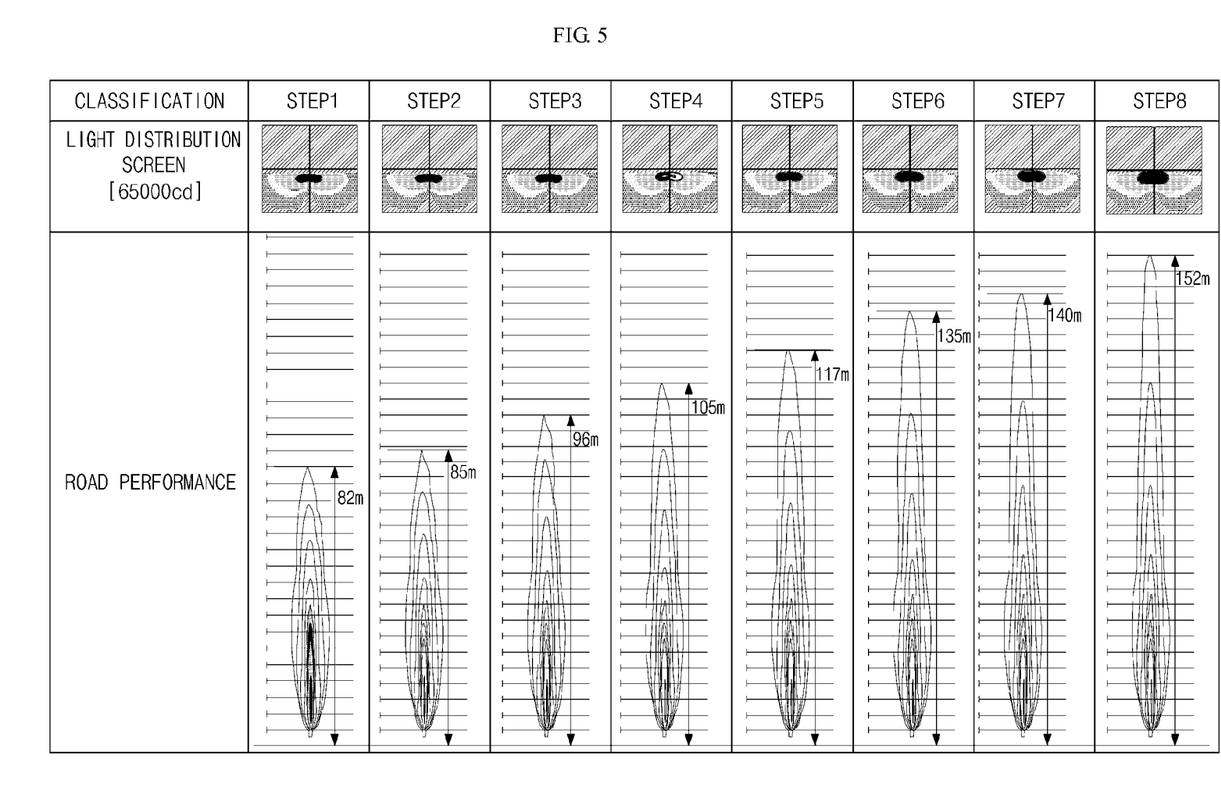
FIG. 5 is a view illustrating a beam pattern of a left ADB head lamp of an ADB head lamp system according to an exemplary embodiment of the present invention.

Further, the control unit 400 controls a beam pattern LH of the ADB head lamp 100 which is installed at a left side of the vehicle 2 and may cause glare to the oncoming vehicle 3 to be optimized in accordance with a distance from the vehicle 4 which drives ahead below a horizontal line, based on the signal, as illustrated in FIG. 5.

Furthermore, a beam pattern RH of the ADB head lamp 100 which is installed at a right side of the vehicle 2 operates with respect to a vehicle which drives at a right side of the driving vehicle 2 among vehicles ahead in the same manner as the ADB head lamp of the related art.

Figure 6:
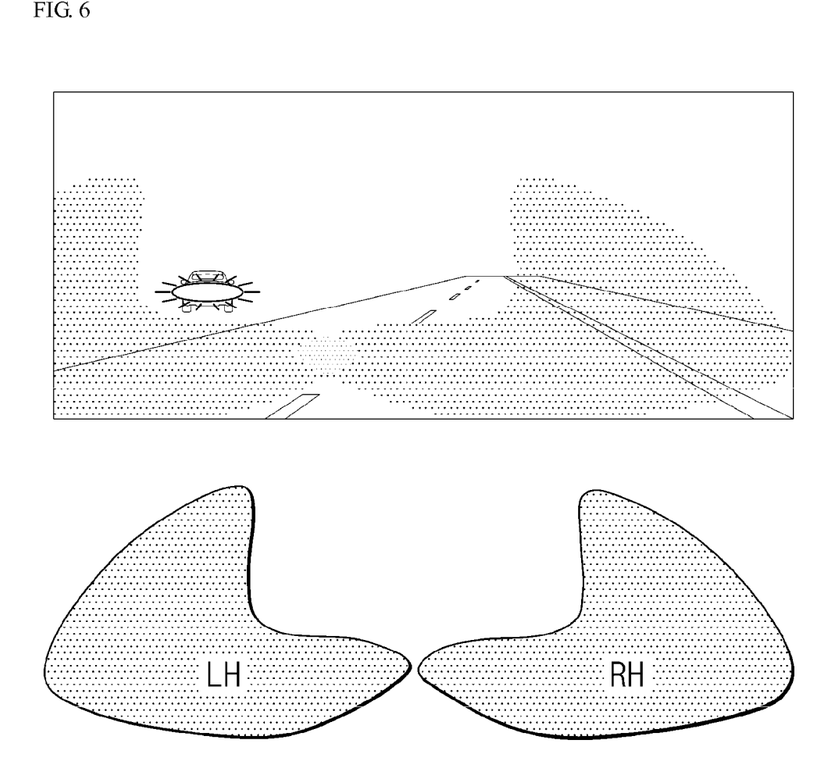
FIG. 6 is a view illustrating a beam pattern by an ADB head lamp of the related art.

In summary, the ADB head lamp system 1 according to an exemplary embodiment of the present invention operates like the ADB head lamp on a normal road, as illustrated in FIG. 6. That is, the ADB head lamp system 1 operates to implement an L shaped beam pattern in accordance with information of a vehicle which drives ahead the vehicle 2 and prevents glare by a swivel operation.

Figure 7:
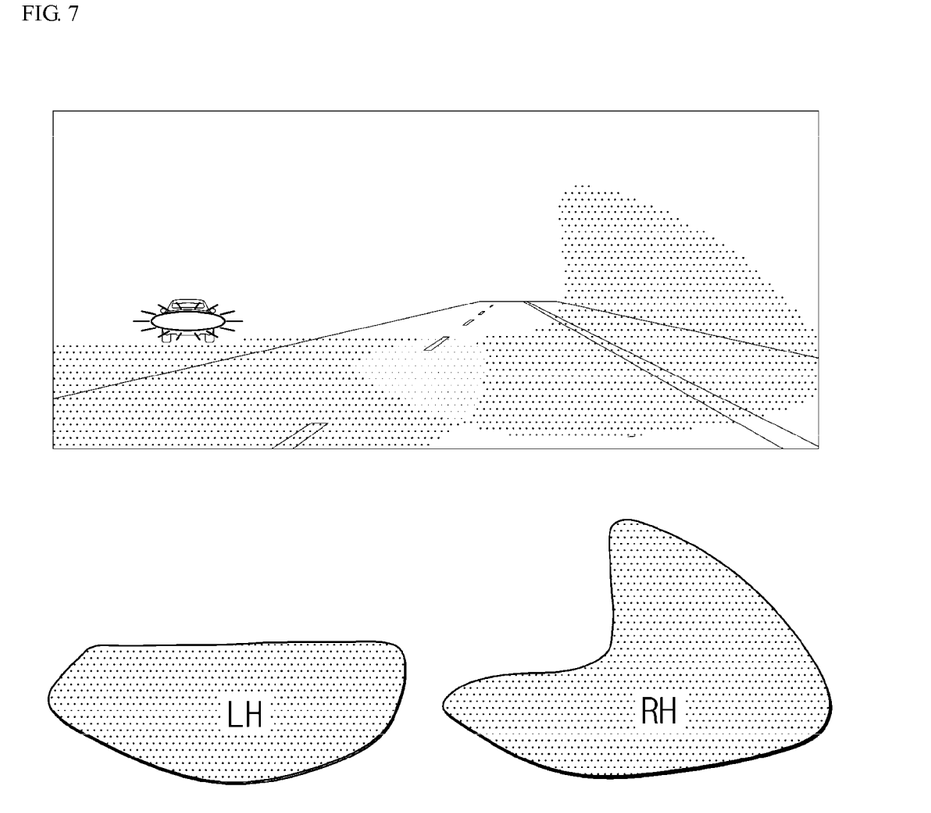
FIG. 7 is a view illustrating a beam pattern by an ADB head lamp system according to an exemplary embodiment of the present invention.

However, on a highway on which an obstacle such as a median strip or a street tree on the median are provided, in order to prevent erroneous operation, as illustrated in FIG. 7, the ADB head lamp 100 which is installed at a left side of the vehicle 2 implements a beam which adjusts only a beam emitting range in accordance with vehicle information of a vehicle which drives ahead. Therefore, glare to a driver who drives the vehicle ahead may be suppressed.

Further, the ADB head lamp 100, which is provided at the right side of the vehicle 2, operates like on the normal road without the presence of obstacles.

The above-described ADB head lamp system 1 is provided based on a left hand driving vehicle like in Korea. In the case of a right hand driving vehicle, the ADB head lamps which are installed on the left side and the right side of the vehicle may operate opposite to the above-described operation.

Hereinafter, a beam control method using the ADB head lamp system according to an exemplary embodiment of the present invention will be described.

Figure 8:
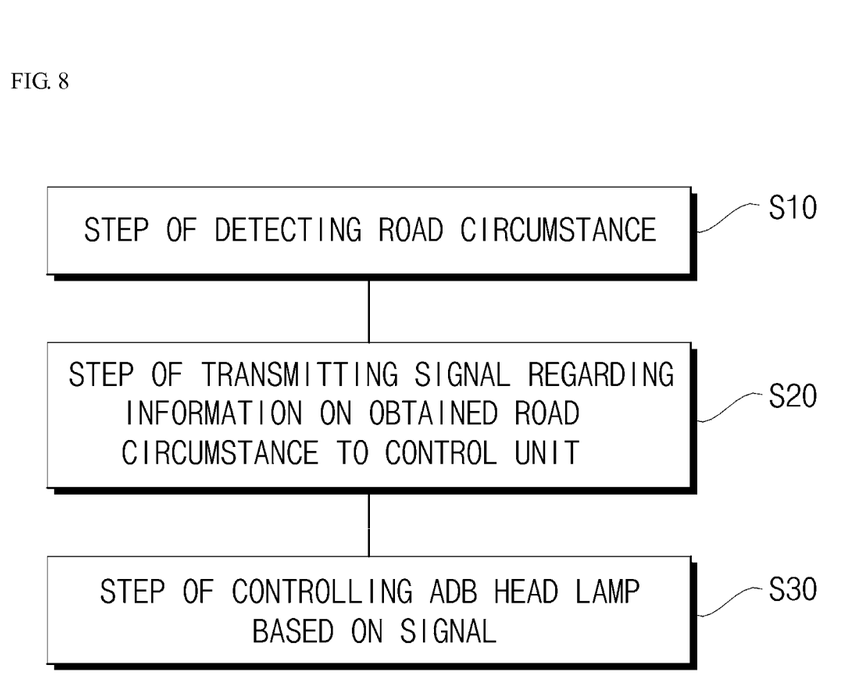
FIG. 8 is a view illustrating a beam control method using an ADB head lamp system according to an exemplary embodiment of the present invention.

Referring to FIG. 8, a beam control method using the ADB head lamp system includes a step of detecting a road circumstance S10, a step of transmitting an information signal obtained in step S10 to a control unit S20, and a step of controlling an ADB head lamp based on the signal S30.

The step of detecting a road circumstance S10 obtains information on a median strip or a street tree on the median from a road circumstance detecting unit 300 provided in the vehicle 2.

Here, the road circumstance detecting unit 300 may be a camera 310 and/or a GPS navigation device 320.

Specifically, the camera 310 may use a traffic signal recognition function.

The step S20 of transmitting a signal regarding the information obtained in the step of detecting a road circumstance to the control unit transmits a signal regarding information on the median strip or the street tree on the median to the control unit 400.

In the step S30 of controlling a ADB head lamp based on the signal, the control unit 400 controls the driving unit 200 which drives the ADB head lamp 100 to allow only the ADB head lamp 100 toward the median strip or the street tree on the median to emit the beam below a horizontal line.

In this case, the beam which is emitted below the horizontal line is adjusted in accordance with the distance from the vehicle 4 which drives ahead.

It is obvious that various exemplary embodiments of the present invention may also solve technical problems other than the problems mentioned in this specification not only in this technical field but also in the related technical field.

Until now, the present invention has been described with reference to the exemplary embodiment. The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. An adaptive driving beam (ADB) head lamp system, comprising:
    an ADB head lamp which is installed in a vehicle;
    a driving unit which drives the ADB head lamp;
    a road circumstance detecting unit; and
    a control unit which controls the driving unit to cause the ADB head lamp to emit a beam below a horizontal line in accordance with a signal which is generated by road circumstance information obtained by the road circumstance detecting unit,
    wherein the road circumstance detecting unit is a camera and/or a GPS navigation device which is provided in the vehicle and obtains road circumstance information of the vehicle which is driving on a highway, through the camera or the GPS navigation device, and
    wherein the road circumstance information is positional information of a median strip or a street tree on the median.

2. The ADB head lamp system of claim 1, wherein the control unit controls only a ADB head lamp oriented toward the median strip or the street tree on the median among the ADB head lamps of the vehicle to emit a beam below a horizontal line.

3. The ADB head lamp system of claim 2, wherein a beam radiating range of a beam which is emitted below the horizontal line is adjusted in accordance with a distance from a vehicle which drives ahead.

4. A beam control method using an adaptive driving beam (ADB) head lamp system, the method comprising:
    obtaining information on a median strip or a street tree on the median of a highway by a road circumstance detecting unit which is installed in a vehicle;
    transmitting a signal regarding information on the median strip or the street tree on the median; and
    controlling, by a controller which receives the signal, a driving unit which drives the ADB head lamp to allow only the ADB head ramp toward the median strip or the street tree on the median among the ADB head lamps of the vehicle to radiate a beam below a horizontal line,
    wherein the road circumstance detecting unit is a camera and/or a GPS navigation device.

5. The control method according to claim 4, wherein a beam irradiating range of a beam which is emitted below the horizontal line is adjusted in accordance with a distance from a vehicle which drives ahead.

6. The control method according to claim 4, wherein the camera uses a traffic sign recognition (TSR) function.

* * * * *